US009430170B2

(12) United States Patent
Yamada

(10) Patent No.: US 9,430,170 B2
(45) Date of Patent: Aug. 30, 2016

(54) IMAGE PROCESSOR THAT GENERATES IMAGE DATA USED IN PRINTING

(71) Applicant: BROTHER KOGYO KABUSHIKI KAISHA, Aichi (JP)

(72) Inventor: Ryuji Yamada, Ogaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/930,938

(22) Filed: Nov. 3, 2015

(65) Prior Publication Data

US 2016/0147487 A1    May 26, 2016

(30) Foreign Application Priority Data

Nov. 25, 2014 (JP) .................................. 2014-237934

(51) Int. Cl.
| | |
|---|---|
| H04N 1/60 | (2006.01) |
| G06F 3/12 | (2006.01) |
| H04N 1/407 | (2006.01) |
| G03G 15/01 | (2006.01) |
| G06K 1/00 | (2006.01) |

(52) U.S. Cl.
CPC ............. *G06F 3/1219* (2013.01); *G03G 15/01* (2013.01); *G06F 3/1239* (2013.01); *H04N 1/407* (2013.01); *H04N 1/60* (2013.01)

(58) Field of Classification Search
CPC ... G06F 3/1219; G06F 3/1239; G03G 15/01; H04N 1/407; H04N 1/60
See application file for complete search history.

(56) References Cited

U.S. PATENT DOCUMENTS

2001/0013939 A1*  8/2001  Weaver ................ G03G 15/326
                                                                358/1.9
2011/0069325 A1*  3/2011  Kawashima .......... G06F 3/1219
                                                                358/1.1

FOREIGN PATENT DOCUMENTS

| JP | 2006-259145 A | 9/2006 |
| JP | 2006-284793 A | 10/2006 |
| JP | 2011-069864 A | 4/2011 |
| JP | 2012-104011 A | 5/2012 |

* cited by examiner

*Primary Examiner* — Quang N Vo
(74) *Attorney, Agent, or Firm* — Scully, Scott, Murphy & Presser, PC

(57) ABSTRACT

In an image processor, a controller is configured to perform: acquiring target image data representing a target image including a first object and a second object; selecting one of a first printing quality and a second printing quality, printing the target image with the second printing quality consuming more colorant than printing the target image with the first printing quality; setting, in a case where the second printing quality is selected, a first scale factor indicating a ratio of a size of a reduced first object to a first object size and a second scale factor indicating a ratio of a size of a reduced second object and a second object size; generating processed image data representing a processed image including the size-reduced first object and the size-reduced second object; and controlling a print executing unit to print the processed image according to the processed image data.

12 Claims, 6 Drawing Sheets

IMAGE PROCESSOR THAT GENERATES IMAGE DATA USED IN PRINTING

CROSS REFERENCE TO RELATED APPLICATION

This application claims priority from Japanese Patent Application No. 2014-237934 filed Nov. 25, 2014. The entire content of the priority application is incorporated herein by reference.

TECHNICAL FIELD

The present disclosure relates to an image process for generating image data used in printing.

BACKGROUND

There are various technologies known in the art for reducing the amount of colorant consumed in a printing operation. For example, there are known techniques in image processing for generating image data used in printing that corrects the colors of the image in order to reduce the amount of colorant expended during the printing process (see Japanese Patent Application Publication No. 2011-69864, for example).

SUMMARY

However, when the colors of the image are corrected according to the above technique, the quality of the image following correction may be worse than the quality prior to correction, resulting in an image quality that may not be satisfactory to the user.

Therefore, it is an object of the disclosure to provide a new technique for processing an image to be printed that can reduce the amount of colorant expended in the printing operation while suppressing a decline in the quality of the printed image.

In order to attain the above and other objects, the disclosure provides an image processor that includes a controller. The controller is configured to perform: acquiring target image data representing a target image, the target image including a plurality of objects, the plurality of objects including a first object having a first object size and a second object having a second object size; selecting one of a first printing quality and a second printing quality, printing the target image with the second printing quality consuming more colorant than printing the target image with the first printing quality; controlling, in a case where the first printing quality is selected, a print executing unit to print the target image according to the target image data; setting, in a case where the second printing quality is selected, a scale factor for each of the plurality of objects, the scale factor being a ratio at which the each of the plurality of objects is reduced in size, a first scale factor indicating a ratio of a size of a reduced first object to the first object size, a second scale factor indicating a ratio of a size of a reduced second object to the second object size; generating, in a case where the second printing quality is selected, processed image data representing a processed image, the processed image including the size-reduced first object and the size-reduced second object; and controlling the print executing unit to print the processed image according to the processed image data.

According to another aspect, the disclosure provides a non-transitory computer readable storage medium storing a printer driver executable by an image processor. The printer driver causes the image processor to perform: acquiring target image data representing a target image, the target image including a plurality of objects, the plurality of objects including a first object having a first object size and a second object having a second object size; selecting one of a first printing quality and a second printing quality, printing the target image with the second printing quality consuming more colorant than printing the target image with the first printing quality; controlling, in a case where the first printing quality is selected, a print executing unit to print the target image according to the target image data; setting, in a case where the second printing quality is selected, a scale factor for each of the plurality of objects, the scale factor being a ratio at which the each of the plurality of objects is reduced in size, a first scale factor indicating a ratio of a size of a reduced first object to the first object size, a second scale factor indicating a ratio of a size of a reduced second object to the second object size; generating, in a case where the second printing quality is selected, processed image data representing a processed image, the processed image including the size-reduced first object and the size-reduced second object; and controlling the print executing unit to print the processed image according to the processed image data.

BRIEF DESCRIPTION OF THE DRAWINGS

The particular features and advantages of the disclosure as well as other objects will become apparent from the following description taken in connection with the accompanying drawings, in which.

DETAILED DESCRIPTION

A. Embodiment

A-1. Structure of an Image Processor

Figure 1:
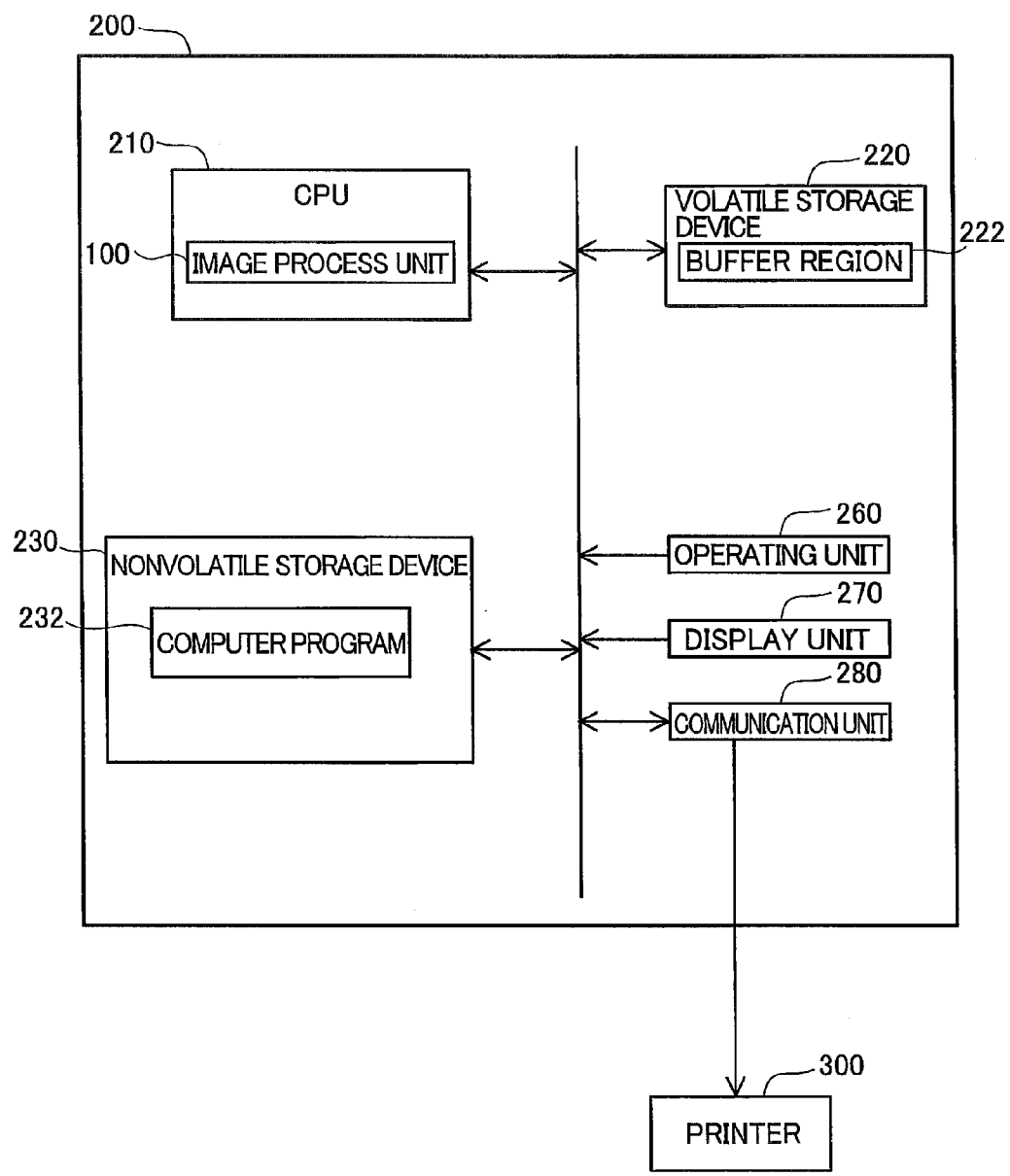
FIG. 1 is a block diagram showing structure of a computer serving as an image processor in an embodiment.

FIG. 1 is a block diagram showing the structure of a computer 200 serving as an image processor in the embodiment. The computer 200 may be a personal computer, for example, and includes a CPU 210 serving as the controller of the computer 200; a volatile storage device 220 configured of RAM or the like; a nonvolatile storage device 230 configured of a hard disk drive or the like; an operating unit 260 configured of a mouse, keyboard, and the like; a display unit 270 configured of a liquid crystal display or the like; and a communication unit 280. The computer 200 can be connected to and communicate with an external device, such as a printer 300, via the communication unit 280.

The volatile storage device 220 is provided with a buffer region 222 for temporarily storing various intermediate data generated when the CPU 210 performs processes. The nonvolatile storage device 230 stores a computer program 232. In the present embodiment, the computer program 232 is a printer drive program for controlling the printer 300. The program may be provided on a CD-ROM or other media, or may be made available for download from a server. By executing the computer program 232, the CPU 210 functions as an image process unit 100 that executes a printing process described later.

The printer 300 is a color laser printer that prints images on paper using toner in the four colors cyan, magenta, yellow, and black (C, M, Y, and K).

A-2. Printing Process

The CPU 210 of the computer 200 (i.e., the image process unit 100) can perform the function of a printer driver by executing a printing process. In the printing process, the CPU 210 controls the printer 300, serving as the print execution unit, to print an image based on image data.

In the present embodiment, the CPU 210 can accept settings related to printing from a user prior to the execution of printing processes, including settings that specify a printing mode. In subsequent printing processes, the CPU 210 operates in the printing modes set based on the user specifications, as will be described later. The computer 200 in the present embodiment offers mode selections related to image quality and mode selections related to toner use. Specifically, the user can select from between a normal quality mode and a fine quality mode. In the fine quality mode, printing is performed at a higher image quality than in the normal quality mode to produce more vivid colors than the colors produced in the normal quality mode. When the fine quality mode has been selected, the user can further select between a normal toner mode and a toner-saving mode as the toner user selections. In the toner-saving mode, printing is performed using less toner than in the normal toner mode.

Figure 2:
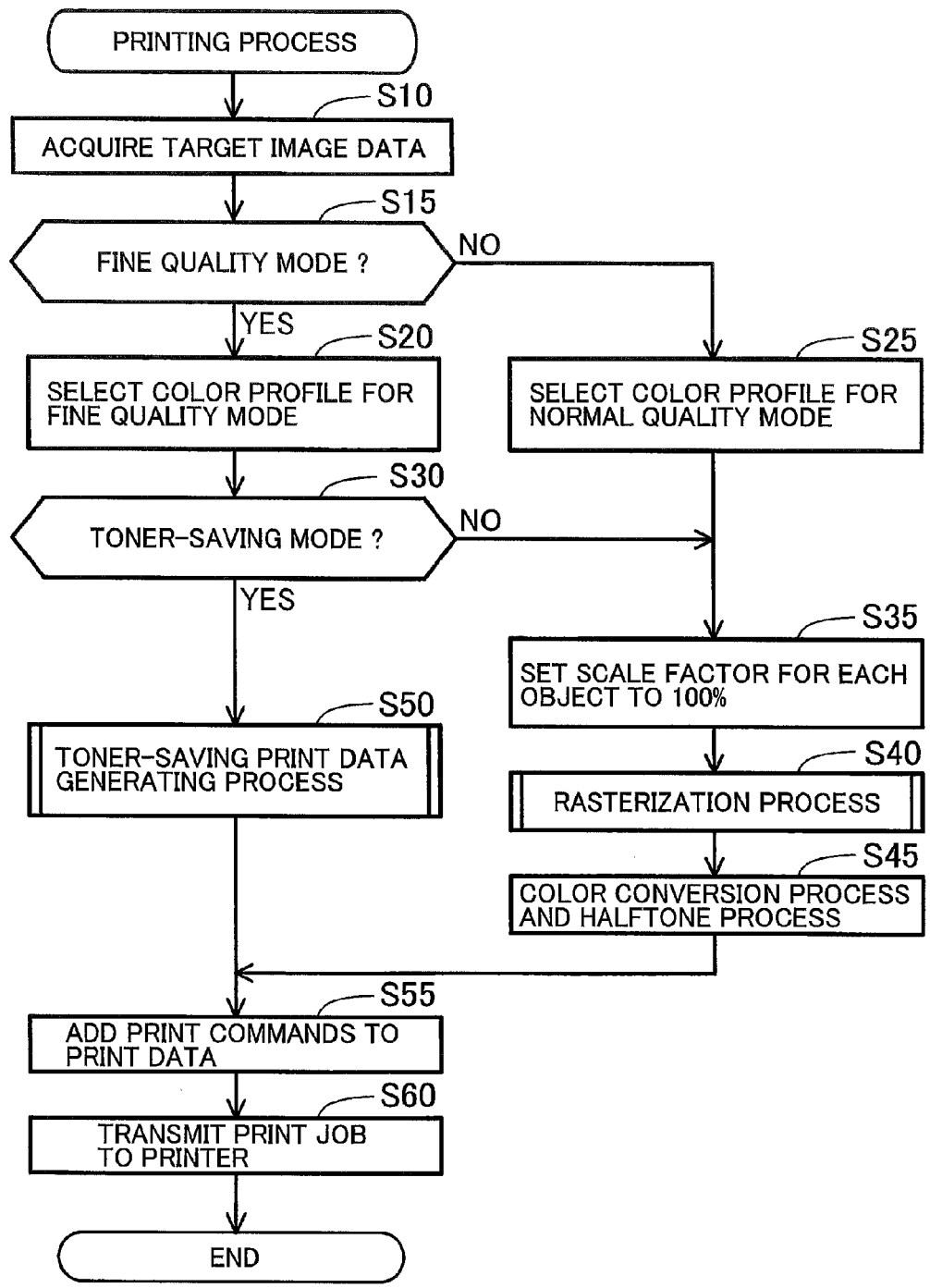
FIG. 2 is a flowchart illustrating steps in a printing process according to the embodiment.

FIG. 2 is a flowchart illustrating steps in the printing process of the present embodiment. The CPU 210 initiates the printing process upon receiving a print command from the user. The print command may be issued via a user interface window (UI window; not shown) displayed by an application program for creating text documents or drawings, for example.

In S10 of FIG. 2, the CPU 210 acquires target image data representing an image that the user wishes to print. More specifically, the CPU 210 acquires target image data representing an image created using the application program. The target image data describes the target image using a method provided by the operating system (hereinafter abbreviated as "OS") of the computer 200. For example, if the OS is Microsoft Windows® (Windows is a registered trademark of Microsoft Corporation), the descriptive method of the target image data conforms to the Graphics Device Interface (GDI) specifications in Windows®. Alternatively, the target image data may be described using a page description language, such as the printer control language (PCL) or PostScript.

Figure 3:
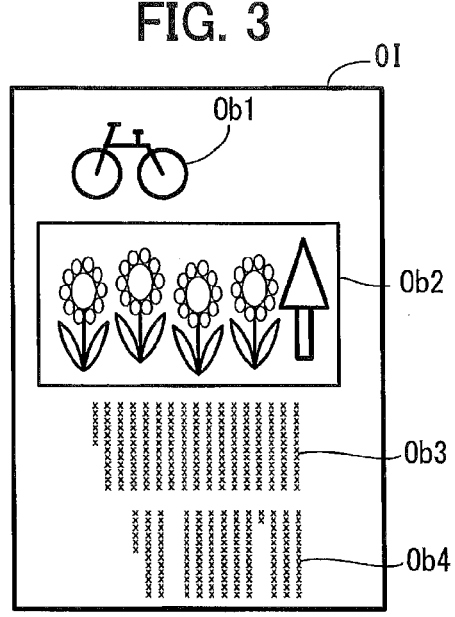
FIG. 3 is an explanatory diagram showing a sample target image represented by target image data.

FIG. 3 shows a sample target image represented by target image data. The target image OI in FIG. 3 includes such objects as a computer graphic Ob1 (hereinafter simply called a "graphic") such as a line drawing, a photo Ob2, and text Ob3 and Ob4. The target image data representing the target image OI includes a plurality of drawing commands defining the plurality of objects Ob1-Ob4.

The drawing commands for the graphic Ob1, photo Ob2, and text Ob3 and Ob4 include data required for drawing each of these objects. For example, the drawing command for the graphic Ob1 includes vectors specifying lines, figures, etc.: data defining attributes of the lines, figures, etc., such as their categories, colors, and sizes; and coordinate data specifying layout positions. The drawing command for the photo Ob2 includes raster data, such as image data in the JPEG format; data defining attributes of the photo, such as its size and color space; and coordinate data specifying layout positions. Drawing commands for the text Ob3 and Ob4 include character codes; data defining attributes of the characters, such as the font type, color, and size; and coordinate data specifying layout positions.

In S15 the CPU 210 determines whether the printing mode for image quality preset by the user indicated the fine quality mode or the normal quality mode. If the printing mode for image quality is set to the fine quality mode (S15: YES), in S20 the CPU 210 selects a color profile used for the fine quality mode and advances to S30. However, if the printing mode for image quality is set to the normal quality mode (S15: NO), in S25 the CPU 210 selects a color profile designed for the normal quality mode and advances to S35. Here, the color profile is data defining correlations between color values of one prescribed color space and color values of a color space that includes color components corresponding to the ink colors used by the printer 300. The color profile is used in a color conversion process described later. In the present embodiment, the color profile is a look-up table defining correlations between color values in the RGB color space (hereinafter called "RGB values") and color values in the CMYK color space (hereinafter called "CMYK values"). In the present embodiment, each component value included in the RGB values and each component value included in the CMYK values is a gradation value having one of 256 levels. When using the color profile for the fine quality mode, chromatic colors in the printed image are rendered more vividly than when using the color profile for the normal quality mode. Consequently, a greater quantity of toner is consumed when using the color profile for the fine quality mode than when using the color profile for the normal quality mode.

In S30 the CPU 210 determines whether the mode related to toner use has been set to the normal toner mode or the toner-saving mode. If the mode for toner use has been set to the toner-saving mode (S30: YES), the CPU 210 advances to S50. However, if the mode for toner use has been set to the normal toner mode (S30: NO), the CPU 210 advances to S35.

In S35-S45 the CPU 210 executes a process for generating print data that does not restrict the quantity of toner used. In S35 the CPU 210 sets the scale factor for each object to 100%. Here, the scale factor of an object is the ratio at which the object is reduced in size during a rasterization process described later and indicates the ratio of the object size after reduction to the object size prior to reduction. When printing in the normal quality mode and when printing in the fine quality mode and the normal toner mode, the scale factor for objects is set to 100%. Accordingly, the size of each object as defined by the target image data is not reduced in the rasterization process described later.

In S40 the CPU 210 executes the rasterization process. The rasterization process is performed to generate bitmap data from the target image data. In the present embodiment, bitmap data is RGB image data expressing the color for each pixel in RGB values, for example.

Figure 4:
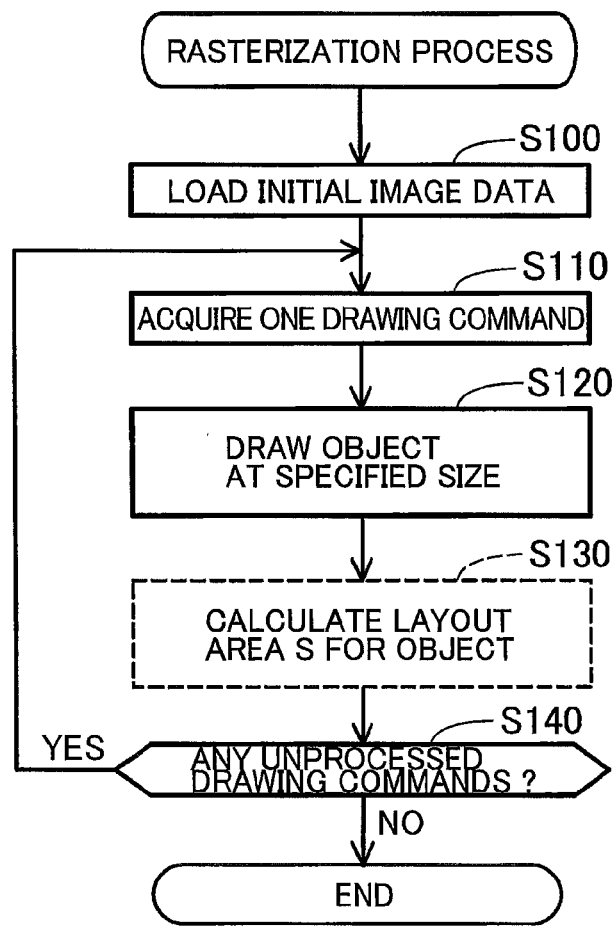
FIG. 4 is a flowchart illustrating steps in a rasterization process.

FIG. 4 is a flowchart illustrating steps in the rasterization process. In S100 of FIG. 4, the CPU 210 loads initial image data into the buffer region 222 that represents an initial image. The initial image is an RGB image of the same size as the image to be generated with RGB values for each pixel set to initial values (values representing white, for example). In S110 the CPU 210 obtains one drawing command from the one or more drawing commands included in the target image data. In S120 the CPU 210 draws the object specified by the drawing command in the initial image at a size reduced from the specified size by the previously set scale factor. Since the scale factor was set to 100% in S35 of FIG. 3 when executing the rasterization process in S40 of FIG. 3, the object is not reduced in size but is drawn in the initial image at the same size specified in the drawing command (i.e., the size specified in the target image data). Step S130 is depicted with a dashed line because this process is omitted when executing the rasterization process in S40 of FIG. 2. The process of S130 will be described later.

In S140 the CPU 210 determines whether there remain any unprocessed drawing commands. When unprocessed drawing commands remain (S140: YES), the CPU 210 returns to S110 and acquires one of the remaining unprocessed drawing commands. When all drawing commands have been processed (S140: NO), the CPU 210 ends the rasterization process.

In S45 of FIG. 2, the CPU 210 executes a color conversion process and a halftone process to generate print data. Specifically, the CPU performs a color conversion process using the color profile selected in either S20 or S25 to convert the RGB image data to CMYK image data representing the color of each pixel in CMYK values. Subsequently, in the halftone process the CPU 210 generates print data from the CMYK image data that specifies the dot formation state (whether or not a dot is formed, in the present embodiment) for each of the CMYK components of each pixel. The CPU 210 uses a well-known technique in the halftone process, such as a dithering method or error diffusion method. The printed image rendered by the print data generated in S45 is an image representing the unaltered target image OI, i.e., an image that includes the objects Ob1-Ob4 at their sizes specified in the target image data.

When the user has selected the fine quality mode and the toner-saving mode, in S50 the CPU 210 executes a process for generating print data that restricts the quantity of toner used. Hereinafter, this process will be called the toner-saving print data generating process and will be described later in greater detail. The print data generated according to the process in S50 differs from the data generated in the process described in S35-S45 that generates print data without restricting the quantity of toner used.

Once the print data has been generated, in S55 the CPU 210 creates a print job by adding various print commands to the print data. In S60 the CPU 210 transmits the print job to the printer 300. The printer 300 then prints images on paper according to the print job received from the computer 200.

A-3. Toner-Saving Print Data Generating Process

Figure 5:
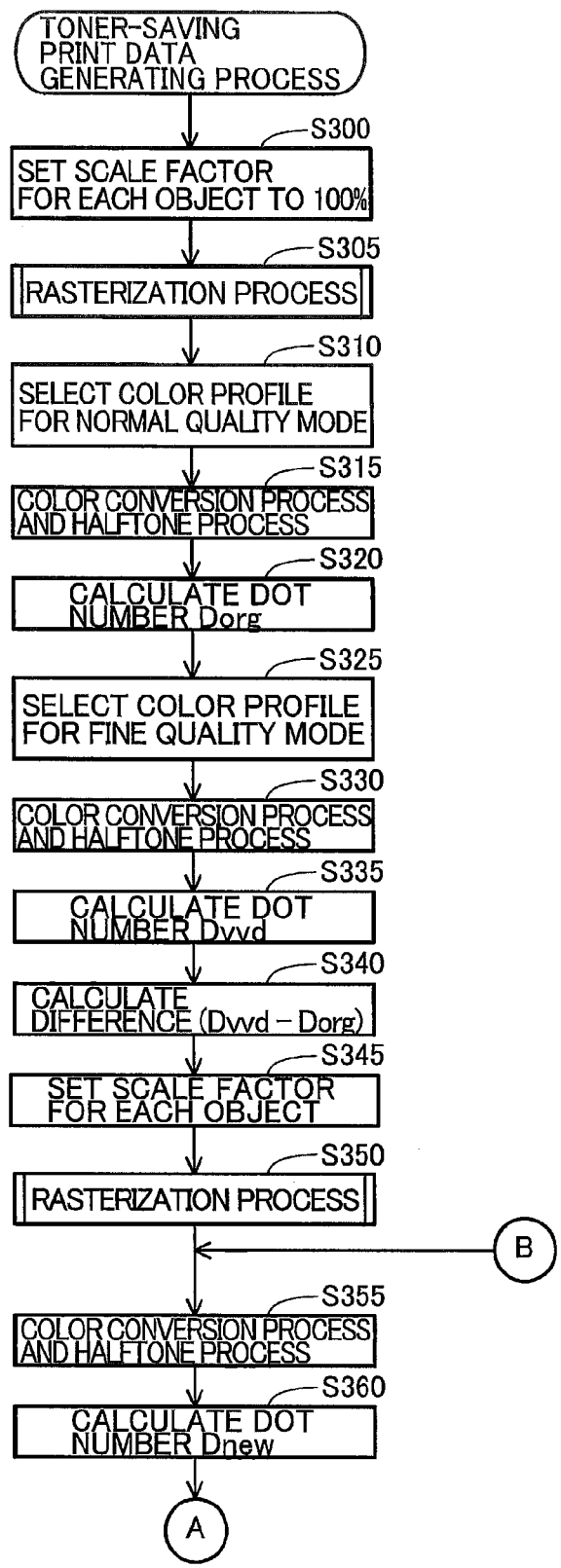
FIG. 5 is a flowchart illustrating steps in a toner-saving print data generating process.
Figure 6:
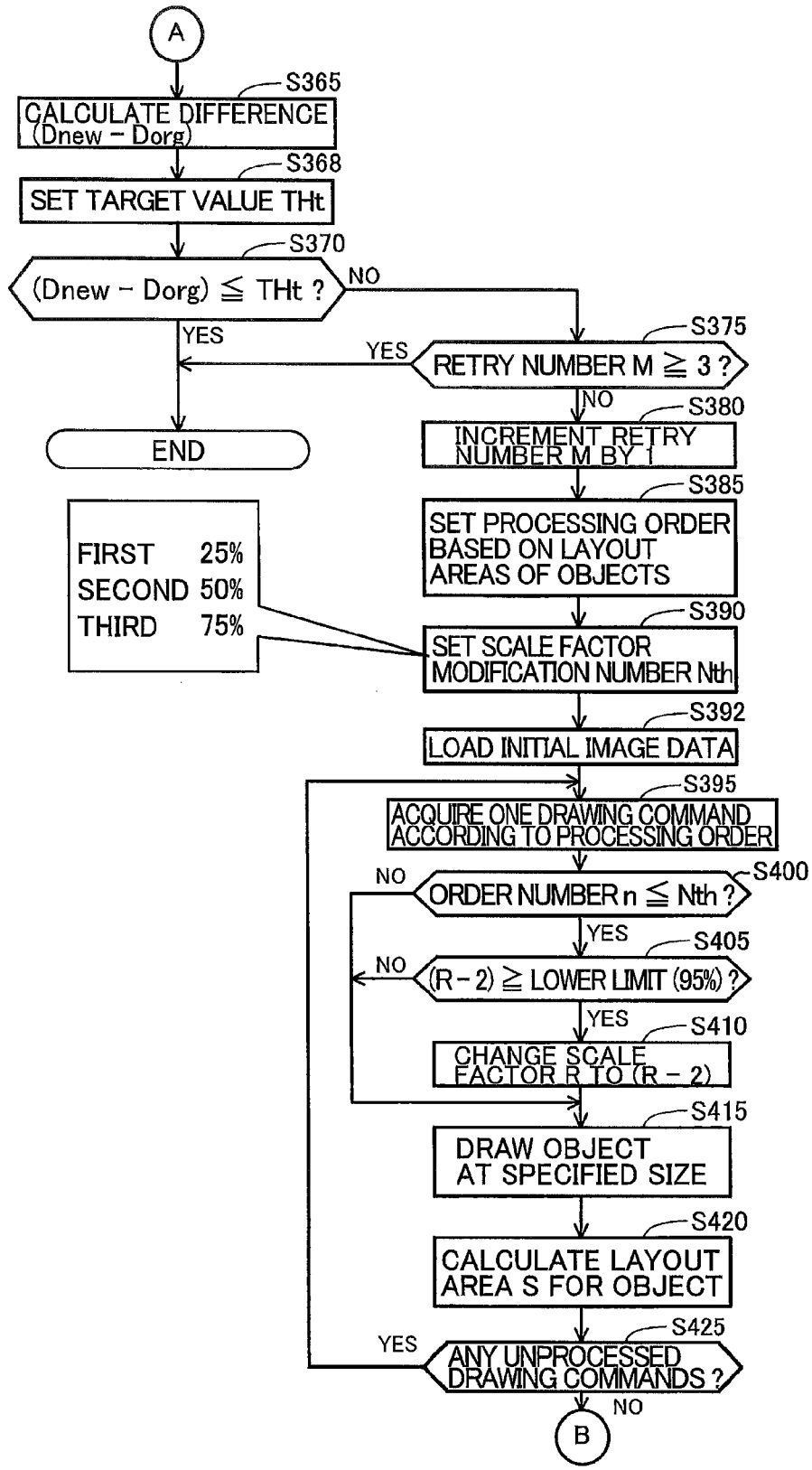
FIG. 6 is a continuation of the flowchart in FIG. 5.

FIGS. 5 and 6 are flowcharts illustrating steps in the toner-saving print data generating process. In this process, the CPU 210 generates print data representing a processed image that includes a plurality of reduced objects. The CPU 210 generates the print data by reducing the size of each object in the target image OI (see the example in FIG. 3) from its size specified in the target image data at the scale factor set for the corresponding object.

In S300 of FIG. 5, the CPU 210 sets the scale factor for each object to 100%. In S305 the CPU 210 executes the rasterization process of FIG. 4 described above. Note that step S130 of FIG. 4 is also not executed during the rasterization process of S305. Through steps S300 and S305, the CPU 210 generates the same RGB image data that would be produced when operating in the normal quality mode and normal toner mode, i.e., RGB image data representing an image that includes the objects Ob1-Ob4 at the size specified in the target image data.

In S310 the CPU 210 selects the color profile for the normal quality mode. In S315 the CPU 210 executes the color conversion process and halftone process to generate print data. That is, the CPU 210 executes a color conversion process on the RGB image data generated in S305 using the color profile for the normal quality mode in order to generate CMYK image data. Next, the CPU 210 executes a halftone process on the CMYK image data to generate print data. Through this process, the CPU 210 generates the same print data that would be produced when the quality-related mode is set to the normal quality mode.

In S320 the CPU 210 uses the print data generated in S315 to calculate a dot number Dorg indicating the total number of dots that will be formed on paper when printing an image based on the print data. The dot number Dorg is the sum of dots formed in each of the CMYK toner colors. The dot number Dorg can be called an index for the quantity of toner consumed when an image including objects at the size specified in the target image data is printed in the normal quality mode.

In S325 the CPU 210 selects the color profile for the fine quality mode. In S330 the CPU 210 executes the color conversion process and halftone process to generate print data. That is, the CPU 210 executes a color conversion process on the RGB image data generated in S305 using the color profile for the fine quality mode in order to generate CMYK image data. Next, the CPU 210 executes a halftone process on the CMYK image data to generate print data. Through this process, the CPU 210 generates the same print data that would be produced when the quality-related mode is set to the fine quality mode and the toner-consumption-related mode is set to the normal toner mode.

In S335 the CPU 210 uses the print data generated in S330 to calculate a dot number Dvvd indicating the total number of dots to be formed on paper when printing an image based on this print data. The dot number Dvvd can be called an index for the quantity of toner consumed when printing an image that includes objects of the size specified by the target image data in the fine quality mode.

In S340 the CPU 210 calculates the difference between the dot number Dvvd calculated in S335 and the dot number Dorg calculated in S320 (Dvvd−Dorg). Since the dot number Dvvd is greater than the dot number Dorg, the difference (Dvvd−Dorg) is a positive value. The difference (Dvvd−Dorg) denotes the quantity of increase in dot number when printing in the fine quality mode instead of the normal quality mode without reducing the size of objects from the sizes specified in the target image data.

In S345 the CPU 210 sets a scale factor for each object in the target image OI based on this difference (Dvvd−Dorg). Specifically, the CPU 210 first converts the difference (Dvvd−Dorg) denoting the quantitative increase in dot number to a percentage of dot increase TR (TR=(Dvvd−Dorg)/Dorg). The percentage of dot increase TR differs according to the characteristic differences between the color profile for the normal quality mode and the color profile for the fine quality mode and according to the target image data, but is a value between a few percent and ten percent in the present embodiment. The CPU 210 references a table TB defining the relationship between percentage of dot increase TR and scale factor to set the scale factor for each object in the target image OI. The table TB is embedded in the computer program 232 in advance.

Figure 7:
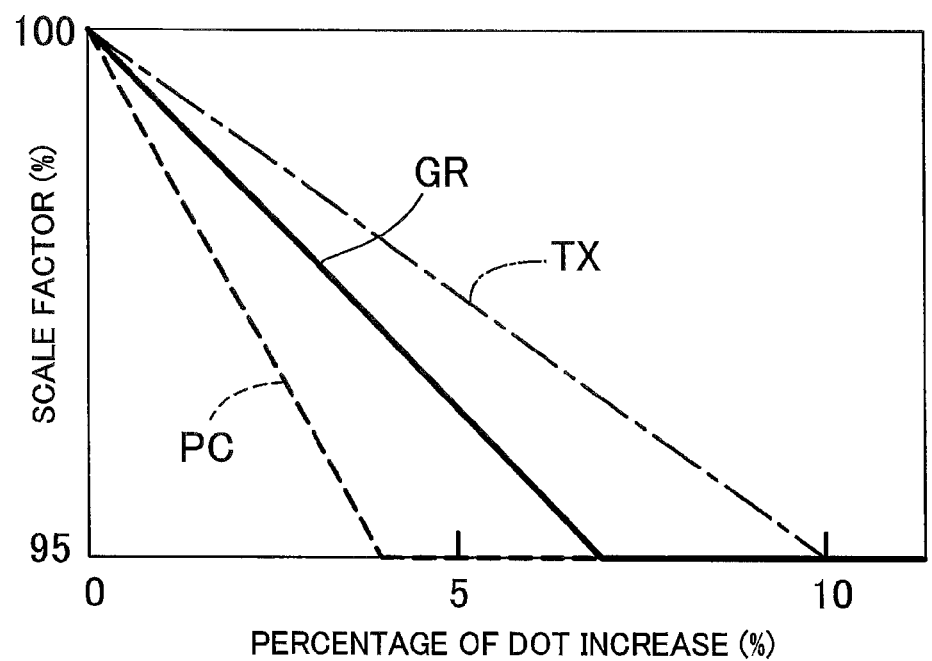
FIG. 7 is a graph showing the relationship between the scale factor and the percentage of dot increase.

FIG. 7 is a graph showing the relationship between percentage of dot increase TR and scale factor as defined in the table TB. In FIG. 7, the dashed line PC denotes the relationship between percentage of dot increase TR and scale factor when the object is a photo. Similarly, the solid line GR and the chain line TX denote the relationships between percentage of dot increase TR and scale factor when the object is a graph and when the object is text, respectively.

As shown in FIG. 7, the scale factor is set to a smaller value for a larger percentage of dot increase TR for all categories of objects. That is, the degree to which an object is reduced in size is greater for a larger percentage of dot increase TR because there is a greater need to reduce the size of an object and to decrease its number of dots when the percentage of dot increase TR is larger. However, the scale factor has a lower limit (95% in the present embodiment) and, hence, cannot be set to a value smaller than the lower limit. Here, the lower limit of the scale factor is set to a value at which an observer would not notice that the printed object has been reduced in size at a glance.

As can be seen from FIG. 7, the scale factor is set to a different value depending on the category of object in the present embodiment. More specifically, the scale factor for a photo is set to a smaller value than the scale factor for a graphic. However, the scale factors for both are identical when set to their lower limits. Similarly, the scale factor for a photo is set to a smaller value than the scale factor for text, and the scale factor for a graphic is set to a smaller value than the scale factor for text. Thus, if the target image data representing the target image OI in the example of FIG. 3 is being processed, it is clear from the above description that a scale factor R2 for the photo Ob2, a scale factor R1 for the graphic Ob1, and a scale factor R3 for the text Ob3 and Ob4 are set to values of decreasing order (R2≤R1≤R3).

In this way, it is possible to reduce the number of dots (quantity of toner used) more efficiently by setting a different scale factor for each category of object than when reducing the size of the overall target image, i.e., than when reducing all objects at the same scale factor. To describe this in greater detail, let us define an object density as the ratio of a surface area S2 for regions occupied by pixels constituting the object (i.e., regions in which dots are to be formed when printing) to a surface area S1 of a region occupied by the entire object (for example, the region of a minimum bounding rectangle of the entire object) (S2/S1). In general, the object density is in decreasing order for photos, graphics, and text. When an object is reduced in size, a ratio DR at which the number of dots decreases is determined by the scale factor used for reduction. Accordingly, if the scale factor for reduction is kept the same, the decrease in number of dots represented by the product of the ratio DR and the total number of dots prior to reduction is greater when the total number of dots prior to reduction is larger, i.e., when the surface area S2 for the region occupied by pixels constituting the object is greater. Therefore, if the scale factor used for reduction is kept the same, the decrease in the number of dots per unit area is greater when the object density is higher. From this description, it is clear that the number of dots can be reduced more efficiently when the scale factor for objects having a high object density (photos, for example) is smaller than the scale factor for objects having a low object density (text, for example).

In S350 of FIG. 5, the CPU 210 executes the rasterization process of FIG. 4. When performing the rasterization process in S350, step S130 of FIG. 4 is also executed. In S130 the CPU 210 calculates the layout area S for the object drawn in S120. The layout area S is the surface area for the region in the minimum bounding rectangle of the object, for example. By performing this rasterization process in S350, the CPU 210 generates RGB image data representing an image that includes objects reduced in size at a scale factor differing according to the category of object set in S345.

In S355 the CPU 210 executes the color conversion process and halftone process described above using the RGB image data just generated. Here, the color profile for the fine quality mode is used in the color conversion process. Consequently, the CPU 210 generates print data representing an image that includes objects reduced at different scale factors depending on the category of object.

In S360 the CPU 210 uses the print data generated in S355 to calculate a dot number Dnew indicating the total number of dots to be formed on paper when an image is printed based on the print data. The dot number Dnew can be called an index for the quantity of toner to be consumed when an image that includes objects reduced in size at different scale factors depending on the category of object from the sizes specified in the target image data is printed in the fine quality mode.

In S365 of FIG. 6, the CPU 210 calculates the difference between the dot number Dnew calculated in S360 and the dot number Dorg calculated in S320 (Dnew−Dorg). The difference (Dnew−Dorg) denotes the amount that the number of dots will increase when objects are reduced from their sizes specified in the target image data and printed in the fine quality mode compared to when the objects are printed in the normal quality mode.

In S368 the CPU 210 sets a target value THt for the increase in dots. Here, the CPU 210 sets the target value THt to the product of the difference (Dvvd−Dorg) calculated in S340 and a prescribed coefficient K (THt=K×(Dvvd−Dorg)). The coefficient K is preset to a value in the range 0-0.5, and specifically 0.3 in the present embodiment. Put another way, the target value THt is set to a value that prevents the number of dots from increasing more than 30% the increase in dots that occurs when the objects are not reduced from their sizes specified in the target image data.

In S370 the CPU 210 determines whether the difference (Dnew−Dorg) is less than or equal to the target value THt. In other words, the CPU 210 confirms whether reducing the objects size has kept the increase in dots to a value no greater than the target value THt. When the difference (Dnew−Dorg) is less than or equal to the target value THt (S370: YES), the CPU 210 ends the current toner-saving print data generating process.

However, when the difference (Dnew−Dorg) is greater than the target value THt (S370: NO), in S375-S425 the CPU 210 executes a retry process to modify the scale factors for the objects and to generate print data that further suppresses an increase in dots formed in the printing operation (i.e., the quantitative increase in toner consumption).

More specifically, in S375 the CPU 210 first determines whether a retry number M denoting the number of times that the retry process of S275-S425 has been executed is greater than or equal to an upper limit of 3 in the present embodiment. Note that M has been previously initialized to the value 0.

If the retry number M is 3 or greater (S375: YES), the CPU 210 ends the current toner-saving print data generating process. However, if the retry number M is less than 3 (S375: NO), in S380 the CPU 210 increments the retry number M by 1.

In S385 the CPU 210 sets a processing order for the plurality of drawing commands included in the target data.

More specifically, the CPU 210 sets the order in which drawing commands for objects are to be processed to a descending order based on the layout areas S of the objects, beginning from the object that occupied the greatest layout area in the previous drawing time. When the retry process is being executed for the first time, the previous drawing time is the time at which objects were drawn (S120 of FIG. 4) during the rasterization process in S350 of FIG. 5 described above, and the CPU 210 sets the processing order for drawing commands based on the layout areas S of the objects calculated in S130 of FIG. 4. When performing the retry process for the second and third times, the previous drawing time is the time at which objects were drawn in S415 of FIG. 6 described below, and the CPU 210 sets the process order for drawing commands based on the layout areas S of objects calculated in S420 of FIG. 6 described below. Here, the layout areas S for objects calculated at the previous drawing time are used in order to obtain different scale factors for reducing the objects each time the drawing commands are processed. Using the target image OI of FIG. 3 as an example, the layout areas S of the objects are in descending order of the photo Ob2, text Ob3, text Ob4, and graphic Ob1. Accordingly, the CPU 210 would set the processing order to reflect the order: drawing command for the photo Ob2, drawing command for the text Ob3, drawing command for the text Ob4, and drawing command for the graphic Ob1.

When reducing the size of objects, the number of dots can be reduced more when the object is larger. Accordingly, it is preferable to give priority to adjusting the scale factor for objects occupying a larger area when changing the scale factors of objects to smaller values in S405 described later in order to better suppress the increase in dots. For this reason, the CPU 210 sets the processing order for drawing commands in S365 to the descending order of the objects' layout area, beginning from the object having the largest layout area.

In S390 the CPU 210 sets a scale factor modification number Nth based on the retry number M. The scale factor modification number Nth indicates the number of objects in the target image whose scale factor will be changed to a smaller value in the retry process, i.e., the number of objects whose degree of reduction will be increased. For the first retry process, the scale factor modification number Nth is set to the largest integer that does not exceed 25% of the total number Ns of objects in the target image. Similarly, in the second and third retry processes, the scale factor modification number Nth is respectively set to the largest integer within 50% and within 75% of the total number Ns of objects in the target image. For example, since the target image OI of FIG. 3 includes four objects Ob1-Ob4 (Ns=4), the scale factor modification number Nth is respectively set to 1, 2, and 3 in the first, second, and third retry processes when processing image data representing the target image OI of FIG. 3.

In S392-S425 the CPU 210 executes a rasterization process for the retry to rasterize the target image data while modifying the scale factors. First, in S392 the CPU 210 loads initial image data representing an initial image into the buffer region 222, as in S100 of FIG. 4. In S395 the CPU 210 acquires a drawing command for a process target according to the processing order determined in S385.

In S400 the CPU 210 determines whether the order number n (where n is an integer, such that 1≤n≤Ns, and denotes the position of the drawing command in the established order) for the drawing command of the process target is less than or equal to the scale factor modification number Nth. If the order number n for the drawing command of the process target is no greater than the scale factor modification number Nth (S400: YES), in S405 the CPU 210 determines whether the value obtained by subtracting 2% from the current scale factor R of the object being drawn according to the drawing command of the process target (R−2) is greater than or equal to the lower limit of the scale factor (95% in the present embodiment). If (R−2) is greater than or equal to the lower limit of the scale factor (S405: YES), in S410 the CPU 210 changes the scale factor for the object being drawn to a value that is smaller by 2%.

However, if (R−2) is less than the lower limit of the scale factor (S405: NO), the CPU 210 skips to the process of S415 without changing the scale factor for the object since the scale factor cannot be set smaller than the lower limit. When the order number n for the drawing command of the process target is greater than the scale factor modification number Nth (S400: NO), then the CPU 210 skips both steps S405 and S410 and advances directly to S415 since the scale factor of the object being drawn is not subject to modification.

In S415 the CPU 210 draws the object reduced from the size specified in the drawing command at the scale factor just set above in the initial image. In other words, when the scale factor was just modified in step S405, the CPU 210 draws the object in the initial image after reducing the object by the new scale factor. If the scale factor was not modified, the CPU 210 draws the object in the initial image after reducing the object at the same scale factor used in the precious rasterization process.

In S420 the CPU 210 calculates the layout area S of the object drawn in S415 just as in S130 of FIG. 4. The layout area S calculated at this time is used for determining the processing order of drawing commands in S385 of the next retry process, if another retry process is performed.

In S425 the CPU 210 determines whether there remain any unprocessed drawing commands. When unprocessed drawing commands remain (S425: YES), the CPU 210 returns to S395 and acquires the next unprocessed drawing command according to the processing order. When all drawing commands have been processed (S425: NO), the CPU 210 returns to S355 of FIG. 5. At this point, the CPU 210 has completed the rasterization process for the retry and has generated RGB image data representing an image in which the scale factors of some objects have been modified.

In S355 the CPU 210 generates new print data by executing the color conversion process and halftone process on the new RGB image data. In the subsequent steps S360-S370, the CPU 210 confirms that the increase in dots (i.e., the difference (Dnew−Dorg)) is suppressed below or equal to the target value THt for the new print data. When the increase in dots has been suppressed below or equal to the target value THt (S370: YES) or when the retry number M has reached the upper limit (3 times in the embodiment; S375: YES), the CPU 210 ends the toner-saving print data generating process.

According to the embodiment described above, the CPU 210 acquires target image data representing a single target image OI (see FIG. 3) having a plurality of objects, including a first object (the text Ob3 in FIG. 3, for example) and a second object (the photo Ob2 in FIG. 3, for example) (S10 of FIG. 2). The CPU 210 sets an image quality at which printing is to be executed by selecting a color profile according to the printing mode (S15-S25 of FIG. 2).

When printing at a first printing quality (the quality according to the normal quality mode, for example), the CPU 210 controls the printer 300 to print an image based on the target image data in which the plurality of objects are rendered at the sizes specified in the target image data (i.e., the printed image representing the unaltered target image OI; S35-S45, S55, and S60 of FIG. 2). On the other hand, when printing at a second printing quality (the quality according to the fine quality mode, for example), the CPU 210 controls the printer 300 to print the image based on print data (i.e., the print data generated in the toner-saving print data generating process of FIGS. 5 and 6) representing an image whose objects have been reduced in size from the sizes specified in the target image data (i.e., a processed image).

In the toner-saving print data generating process of FIGS. 5 and 6, the CPU 210 sets the scale factor for each of the plurality of objects (S345 of FIG. 5). For example, the CPU 210 sets the scale factor for a first object (the text Ob3 in FIG. 3, for example) to a first scale factor, and sets the scale factor for a second object (the photo Ob2 in FIG. 3, for example) to a second scale factor different from the first scale factor.

Next, the CPU 210 generates print data by executing the rasterization process in S350 of FIG. 5 and the color conversion and halftone processes in S355 on the target image data. Consequently, the first object in the image represented by the print data is reduced from the size specified in the target image data by the first scale factor, while the second object is reduced from its size specified in the target image data by the second scale factor.

As a result, each of the objects Ob1-Ob4 is reduced to a size suited to the category of object. Accordingly, this method can reduce the amount of toner consumed while suppressing a drop in the quality of the printed image. That is, the CPU 210 can print an image that is more vivid and higher in quality than an image printed in the normal quality mode since the CPU 210 performs the color conversion process (S355 in FIG. 5) using the color profile for the fine quality mode when performing the toner-saving print data generating process. At the same time, since each object is reduced from their size specified in the target image data to a size suited to the category of object, the CPU 210 can efficiently suppress the amount of toner consumed without excessively reducing the sizes of the objects.

When the quantity of toner consumed is excessively large while printing in the fine quality mode, the number of sheets that can be printed in this mode is much less than when printing in the normal quality mode. However, by specifying the toner-saving mode, the user can mitigate this reduction in printable sheets, even when printing in the fine quality mode.

Further, the computer 200 of the preferred embodiment sets the printing quality for printing operations based on specifications by the user. That is, the computer 200 sets the image quality for printing based on the printing mode set by the user as described above (S15-S25 in FIG. 2). Accordingly, the computer 200 can reduce the amount of toner used while suppressing a drop in image quality based on the image quality set according to the user's specification.

Further, when the printing mode is set to the fine quality mode, the computer 200 according to the present embodiment can determine whether or not to reduce the quantity of toner consumed based on a user specification. More specifically, when the user has set the toner-saving mode as described above (S30: YES in FIG. 2), the CPU 210 executes the toner-saving print data generating process to reduce the amount of toner consumed (S50). In other words, when printing in the fine quality mode, the CPU 210 can direct the printer 300 to print an image in which objects have been reduced in size according to a scale factor set for each object in order to decrease the quantity of toner consumed based on the user's specification. Accordingly, the computer 200 can reduce toner consumption while suppressing a drop in image quality when the user has instructed the computer 200 to user less toner.

In the embodiment described above, the CPU 210 calculates the dot number Dorg indicating a first colorant quantity to be consumed when printing an image with objects at the sizes specified in the target image data (i.e., a printed image representing the unaltered target image) in the normal quality mode (S320 in FIG. 5). The CPU 210 further calculates the dot number Dvvd indicating a second colorant quantity to be consumed when printing an image with objects at the sizes specified in the target image data in the fine quality mode (S335 in FIG. 5). Next, the CPU 210 sets a scale factor for each object based on the difference (Dvvd−Dorg) (S340 and S345 in FIG. 5). In this way, the CPU 210 can set a suitable scale factor for each object. For example, the larger the difference (Dvvd−Dorg), the smaller the scale factor of an object and the greater the degree to which the object is reduced (FIG. 7). Accordingly, the CPU 210 can set suitable scale factors that prevent toner consumption when printing in the fine quality mode from being increased excessively over toner consumption when printing in the normal quality mode.

Further, the CPU 210 calculates the dot number Dnew indicating a third colorant quantity that is consumed when printing an image represented by the print data generated in S350 and S355, i.e., an image whose objects are reduced at a scale factor set for each individual object (S360 in FIG. 5). Next, the CPU 210 compares the difference (Dnew−Dorg) to the target value THt (S370 in FIG. 6). When the difference (Dnew−Dorg) is greater than the target value THt (S370: NO), the CPU 210 executes the retry process (S375-S425 in FIG. 6). In this way, the CPU 210 can perform a process to confirm whether the increase in toner consumption was sufficiently suppressed and performs the retry process when the increase was not sufficiently suppressed, thereby reducing the possibility that toner consumption is not sufficiently suppressed. Note that comparing the difference (Dnew−Dorg) to the target value THt is equivalent to comparing Dnew to a specific threshold value (target value THt+Dorg).

In the retry process of the embodiment, the CPU 210 modifies scale factors for objects in the target image in descending order of layout area, from the object whose order number n is 1 (i.e., the object occupying the largest layout area S among the total number Ns of objects in the target image) to the object whose order number n is Nth (the scale factor modification number set in S390 based on a percentage of the total number Ns), while not modifying the scale factor of objects whose order number n is greater than Nth (S390, S400-S410 in FIG. 6). In other words, the CPU 210 modifies the scale factors of objects having a first surface area, while not modifying the scale factors of objects having a second surface area smaller than the first surface area. Accordingly, the CPU 210 can give more priority to modifying the scale factors of objects that require a relatively large amount of toner in the printing operation over the scale factors of objects that require a relatively small amount of toner. Thus, the computer 200 can effectively reduce toner consumption when printing an image represented by the print data produced in the retry process. Hence, the computer 200 can avoid excessively reducing the sizes of objects in order to reduce toner consumption.

The retry process is executed repeatedly until the difference (Dnew−Dorg) drops to the target value THt or lower (S370 in FIG. 6), enabling the computer 200 to reduce toner consumption sufficiently. Further, the CPU 210 does not modify the scale factors of objects below a prescribed lower limit (95%, for example; S405 in FIG. 6). In this way, the computer 200 can reduce toner consumption an extent that does not reduce the printed objects excessively.

In S345 of FIG. 5, the CPU 210 sets the scale factors for non-text objects (graphic and photo objects, for example) to smaller values than the scale factor for text, as illustrated in FIG. 7. In other words, the degree in which objects other than text are reduced is set greater than the degree in which text objects are reduced. As described above, the object density in a text region is generally smaller than the object density for objects other than text. Accordingly, the CPU 210 can more efficiently reduce toner consumption by setting the scale factors for objects other than text smaller than the scale factor for text.

B. Variations of the Embodiment (1) In the retry process of the embodiment described above, the CPU 210 gives priority to modifying the scale factors of objects that consume a relatively large amount of toner during printing over objects that consume a relatively small amount of toner by modifying the scale factors of objects having a relatively large layout area S and not modifying the scale factors of objects having a relatively small layout area S (S390, S400-S410 in FIG. 6). However, the CPU 210 may instead give priority to modifying the scale factors of objects that consume a relatively large amount of toner over objects that consume a relatively small amount of toner by modifying the scale factors of objects having a relatively large object density and not modifying the scale factors of objects having a relatively small object density. Further, since toner consumption tends to be greater when printing darker colors, the CPU 210 may give priority to modifying the scale factors of objects that consume a relatively large amount of toner over objects that consume a relatively small amount of toner by modifying the scale factors of objects having colors with a relatively high density while not modifying the scale factors of objects having colors with a relatively low density. More specifically, when the representative color (average color, for example) of an object is expressed in CMYK values, the CPU 210 may determine that the density of the color is higher when the individual CMYK component values are larger. Alternatively, the CPU 210 may generate a histogram of the object and calculate the number of pixels in the object whose density exceeds a threshold value. Here, the CPU 210 determines that the object has colors of high density when a large number of pixels have densities that exceed the threshold value.

(2) In the embodiment described above, the printer 300 is a laser printer that uses toner as the colorant, but the printer 300 may be an inkjet printer that uses ink as the colorant and that prints images by ejecting the ink to form dots. In this case, the process in FIGS. 5 and 6 can reduce the amount of ink consumed while suppressing a drop in image quality.

(3) In the embodiment described above, the CPU 210 executes the process in FIGS. 5 and 6 when the fine quality mode and toner-saving mode have been set, but does not execute this process when the toner-saving mode has not been set, even if the fine quality mode has. However, the computer 200 may be configured to execute the process in FIGS. 5 and 6 whenever the fine quality mode is set.

(4) In the embodiment described above, the CPU 210 sets the scale factors for objects based on their category, focusing on the premise that different object categories have different object densities, but a different scale factor may be set for each object according to various methods. More specifically, it is preferable to employ a method that sets the scale factor of objects that consume a relatively large amount of toner during printing smaller than the scale factor of objects that consume a relatively small amount of toner. In this way, the computer 200 can reduce toner consumption more efficiently than when reducing the size of the overall image according to a specific scale factor. For example, the scale factor for objects having a relatively large layout area S may be set to a value smaller than the scale factor for objects having a relatively small layout area S. Alternatively, the scale factor for objects having colors with a relatively high density may be set to a value smaller than the scale factor for objects having colors with a relatively low density.

(5) In S368 of FIG. 6 in the embodiment described above, the target value THt for an increase in dots is set to the product of the difference (Dvvd−Dorg) and a prescribed coefficient K. While the coefficient K is a fixed value in the embodiment, the coefficient K may be set dynamically instead. For example, the coefficient K may be set based on the categories of objects included in the target image. More specifically, the value of the coefficient K may be decreased in order to set a more restrictive target value THt when the plurality of objects included in the target image include a high ratio of photos because it is more important to reduce toner consumption in images having a high ratio of photos, as such photos tend to consume much toner. The lower limit of the scale factor for photos may also be decreased as the value of the coefficient K is decreased, i.e., as the target value THt is set to a more restrictive value. In this case, the lower limit of the scale factor for photos may be set smaller than the lower limits on the scale factors for other objects (text, for example) because decreasing the lower limit on the scale factor for photos will have a greater effect on reducing toner consumption. In addition, it is more tolerable to reduce the scale factor for photos because a reduction in the size of photos is less noticeable than a reduction in the size of text, since text may become unreadable.

(6) The retry process described in the embodiment may be omitted. In other words, the process from S360 to S425 may be omitted, with the toner-saving print data generating process ending after S355 in FIG. 5.

(7) The image processor that implements the printing process in FIG. 2 may be any of various devices, and is not limited to the computer 200. For example, a control device in the printer designed to control the operations of the printer may also execute the printing process in FIG. 2 in order to control a printing engine to execute the printing operation. Alternatively, the printing process of FIG. 2 may be executed by a server connected to the printer over the Internet, or a portable terminal such as a smartphone connected to the printer over a wireless network. Further, a plurality of computers that can communicate over a network may each implement some of the functions of the printing process in FIG. 2 so that the devices as a whole can execute the printing process. In this case, the entire set of computers that contribute to the printing process is an example of the image processor.

(8) Part of the configuration implemented in hardware in the embodiment described above may be replaced with software and, conversely, all or part of the configuration implemented in software may be replaced with hardware. For example, all or part of the steps in the printing process of the embodiment may be implemented by hardware, such as an ASIC.

While the description has been made in detail with reference to specific embodiments thereof, it would be apparent to those skilled in the art that many modifications and variations may be made therein without departing from the spirit of the above described embodiments, the scope of which is defined by the attached claims.

What is claimed is:

1. An image processor comprising:
   a controller configured to perform:
   acquiring target image data representing a target image, the target image including a plurality of objects, the plurality of objects including a first object having a first object size and a second object having a second object size;
   selecting one of a first printing quality and a second printing quality, printing the target image with the second printing quality consuming more colorant than printing the target image with the first printing quality;
   controlling, in a case where the first printing quality is selected, a print executing unit to print the target image according to the target image data;
   setting, in a case where the second printing quality is selected, a scale factor for each of the plurality of objects, the scale factor being a ratio at which the each of the plurality of objects is reduced in size, a first scale factor indicating a ratio of a size of a reduced first object to the first object size, a second scale factor indicating a ratio of a size of a reduced second object to the second object size;
   generating, in a case where the second printing quality is selected, processed image data representing a processed image, the processed image including the size-reduced first object and the size-reduced second object; and
   controlling the print executing unit to print the processed image according to the processed image data.

2. The image processor according to claim 1, wherein the selecting selects one of a plurality of printing qualities including the first printing quality and the second printing quality in conformity with user's instruction.

3. The image processor according to claim 2, wherein the controller is further configured to perform determining whether or not to reduce a colorant quantity consumed in a printing operation in conformity with the user's instruction;
   wherein the setting sets the scale factor when the selecting selects the second printing quality and the determining determines to reduce the colorant quantity.

4. The image processor according to claim 1, wherein the controller is further configured to perform calculating a first colorant quantity and a second colorant quantity, the first colorant quantity indicating a colorant quantity to be consumed when printing the target image with the first printing quality, the second colorant quantity indicating a colorant quantity to be consumed when printing the target image with the second printing quality;
   wherein the setting sets the scale factor according to difference between the first colorant quantity and the second colorant quantity.

5. The image processor according to claim 1, wherein the controller is further configured to perform:
   comparing a third colorant quantity to a specific threshold value, the third colorant quantity indicating a colorant quantity to be consumed when printing the processed image with the second printing quality;
   changing the scale factor for at least one of the plurality of objects into a smaller value when the third colorant quantity is greater than the specific threshold value; and
   generating processed image data by using the changed scale factor.

6. The image processor according to claim 5, wherein the changing gives priority to change a scale factor for one of the plurality of objects than a scale factor for another of the plurality of objects, a colorant quantity to be consumed when printing the one of the plurality of objects being larger than a colorant quantity to be consumed when printing the another of the plurality of objects.

7. The image processor according to claim 6, wherein the changing changes a first scale factor for the first object and maintains a second scale factor for the second object, the first object having a first area, the second object having a second area smaller than the first area.

8. The image processor according to claim 5, wherein the controller is further configured to perform repeating the comparing, the changing, and the generating until the third colorant quantity becomes equal to or smaller than the specific threshold value.

9. The image processor according to claim 5, wherein the controller is further configured to perform repeating the comparing, the changing, and the generating;
   wherein the changing does not change a first scale factor for the first object but changes a second scale factor for the second object when the first scale factor falls to a lower limit but the second scale factor is greater than the lower limit.

10. The image processor according to claim 1, wherein the setting sets the scale factor depending on a category of the each of the plurality of objects.

11. The image processor according to claim 10, wherein the setting sets the first scale factor for the first object and the second scale factor smaller than the first scale factor for the second object when the first object includes text whereas the second object does not include text.

12. A non-transitory computer readable storage medium storing a printer driver executable by an image processor, the printer driver causing the image processor to perform:
   acquiring target image data representing a target image, the target image including a plurality of objects, the plurality of objects including a first object having a first object size and a second object having a second object size;
   selecting one of a first printing quality and a second printing quality, printing the target image with the second printing quality consuming more colorant than printing the target image with the first printing quality;
   controlling, in a case where the second printing quality is selected, a print executing unit to print the target image according to the target image data;
   setting, in a case where the second printing quality if selected, a scale factor for each of the plurality of objects, the scale factor being a ratio at which the each of the plurality of objects is reduced in size, a first scale factor indicating a ratio of a size of a reduced first object to the first object size, a second scale factor indicating a ratio of a size of a reduced second object to the second object size;
   generating, in a case where the second printing quality is selected, processed image data representing a processed image, the processed image including the size-reduced first object and the size-reduced second object; and controlling the print executing unit to print the processed image according to the processed image data.

\* \* \* \* \*